United States Patent Office 2,992,233
Patented July 11, 1961

2,992,233
SPIROBI(META-DIOXANE) DERIVATIVES CONTAINING SULFUR AND HALOGEN
Harry A. Stansbury, Jr., South Charleston, and Howard R. Guest, Charleston, W. Va., assignors to Union Carbide Corporation, a corporation of New York
No Drawing. Filed Sept. 26, 1957, Ser. No. 686,276
9 Claims. (Cl. 260—340.7)

This invention relates to novel spirobi(metadioxane) derivatives and their preparation. In a particular aspect, this invention relates to the production of sulfur- and halogen-containing spirobi(meta - dioxane) derivatives which are useful as intermediate reactants and as accelerators for curing rubber.

It is an object of the present invention to provide a method for producing sulfur- and halogen-containing spirobi(meta-dioxane) derivatives from 3,9-divinylspirobi-(meta-dioxane) compounds.

It is another object of this invention to provide sulfur- and halogen-containing spirobi(meta-dioxane) derivatives which have active sites that can react under suitable conditions.

Other objects and advantages of the present invention will become apparent to those skilled in the art from the following description.

The compounds according to this invention are produced by reacting together a 3,9-divinylspirobi(meta-dioxane) derivative and a sulfur halide having at least one reactive (S—X) group, wherein X is a halogen with an atomic weight between 30 and 130, i.e., chlorine, bromine and iodine.

The 3,9-divinylspirobi(meta-dioxane) reactants preferred are those which have the formula:

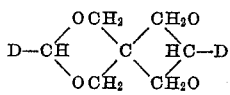

wherein D is selected from the group consisting of (R—CH=CH—)

and

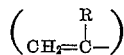

and R is selected from the group consisting of hydrogen, halogen and lower alkyl.

The 3,9-divinylspirobi(meta-dioxane) compounds which are most conveniently and economically prepared from widely available starting materails are those which have hydrogen or a methyl group substituted on each vinyl group. The 3,9-divinylspirobi(meta-dioxane) compounds which contain groups other than hydrogen and methyl substituted on the vinyl groups are generally more difficult to prepare. These other groups must be of a character and in a position on the vinyl groups not to interfere with the effective reactions of 3,9-divinylspirobi(meta-dioxane) compounds in the processes of the present invention.

3,9 - divinylspirobi(meta - dioxane) compounds which contain a terminal methylene group are of particular advantage for ease of reaction, quality of product, etc. Their use, therefore, generally is the most preferred. Substituents on the vinyl groups of a spirobi(meta-dioxane) nucleus may be included to alter the properties of the reaction product and/or to act as reactive sites for chemical transformation of said products under suitable conditions.

The preferred 3,9-divinylspirobi(meta-dioxane) starting materials of this present invention may be prepared by the condensation of a mole of pentaerythritol with two moles of acrolein or an acrolein derivative in the presence of an acid catalyst such as p-toluenesulfonic acid. This well known synthetic method is published in detail in Schulz and Wagner, Angew. Chemie 62, 118 (1950), and in German Patents 858,406; 870,032 and 885,006.

The 3,9-divinylspirobi(meta-dioxane) compounds which contain terminal methylene groups are derived from the reaction of pentaerythritol with α,β-unsaturated aldehydes such as acrolein, alpha-methyl acrolein, alpha-ethyl acrolein, alpha-propyl acrolein, alpha-butyl acrolein, alpha-isobutyl acrolein, alpha-chloro acrolein, and the like.

When acrolein is used, an unsubstituted 3,9-divinylspirobi(meta-dioxane) is obtained:

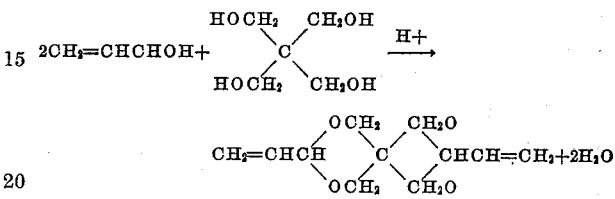

When the condensation is conducted with (a) alpha-methyl acrolein, or (b) crotonaldehyde, then methyl-substituted 3,9-divinylspirobi(meta-dioxanes) are obtained:

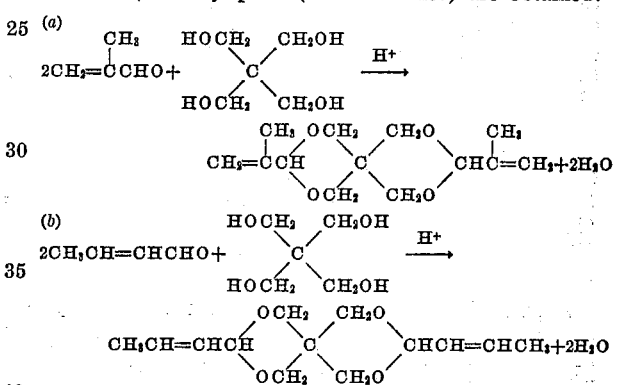

It is not necessary that the α,β-unsaturated aldehyde reacted with pentaerythritol be pure or a single species. Mixtures of α,β-unsaturated aldehydes may be condensed with pentaerythritol for purposes of convenience and economy. The resulting products are mixtures of 3,9-divinylspirobi(meta-dioxane) compounds which may be used in their crude form directly in the processes of this invention.

As previously mentioned, in the processes of this invention novel chemical compounds are produced by reacting a 3,9-divinylspirobi(meta-dioxane) derivative with a sulfur halide containing at least one reactive (S—X) group, where X is a halogen with an atomic weight between 30 and 130, i.e., chlorine, bromine and iodine. The term "sulfur halide" as used in this invention is meant to include both inorganic sulfur halides and organic sulfenyl halides.

The sulfur halide reactants preferred are those which have the formula:

wherein X is halogen with atomic weight between 30 and 130; m is an integer which can be either 1 or 2; and Z is selected from the group consisting of lower alkyl, haloalkyl, alicyclic, aromatic, alkaryl, aralkyl, chlorine when X is chlorine, and bromine when X is bromine and m is 2.

The essential feature of the sulfur halides useful in this invention is the presence of at least one sulfur-halogen group (S—X) which is capable of splitting into sulfur and halogen radicals, said radicals then having the ability to react with the vinyl positions in 3,9-divinylspirobi(meta-dioxane) compounds. Sulfur halides which are applicable for the production of the novel compounds of this invention include sulfur monochloride, sulfur dichloride, sulfur monobromide, methanesulfenyl chloride, trichloromethylsulfenyl chloride; trifluoromethanesulfenyl chloride; monochloromethanesulfenyl chloride; dichloromethoxymethanesulfenyl chloride; triphenylmethanesulfenyl chloride; ethanesulfenyl chloride; 1-chloroethanesulfenyl chloride; 1,1-dichloroethanesulfenyl chloride; 2-chloroethanesulfenyl chloride, 2-chloroethanesulfenyl bromide, ethylenebis(disulfur chloride); ethylenebis(disulfur bromide), propanesulfenyl chloride; 1-chloropropanesulfenyl chloride; 3-chloropropanesulfenyl chloride; 1-chloro-2-propanesulfenyl chloride; 1,1-dichloropropanesulfenyl chloride; butanesulfenyl chloride; benzenesulfenyl chloride; p-chlorobenzenesulfenyl chloride; 2-nitrobenzenesulfenyl bromide; 2,4-dinitrobenzenesulfenyl bromide; 2-nitrobenzenedisulfur chloride; benzothiazolylsulfenyl chloride; benzothiazolylsulfenyl bromide; benzothiazolyliodide, and the like.

Several different methods of synthesizing sulfur halides are reported in the chemical literature. The following reaction schemes are examples of some synthetic methods applicable for the preparation of these compounds:

(1) $S + Cl_2 \rightarrow S_2Cl_2 + SCl_2$
(2) Metallic sulfides $+ PCl_5 \rightarrow S_2Cl_2 + SCl_2$
(3) $NOCl + S \rightarrow NO + S_2Cl_2$
(4) $CaSO_4 + C + Cl_2 \rightarrow CaCl_2 + S_2Cl_2 + CO + CO_2$
(5) $S_2Cl_2 + S \rightarrow S_xCl_2$ (where $x$ is below 20)
(6) $S_2Cl_2 + BBr_3 \rightarrow S_2Br_2$
(7) $CS_2 + Cl_2 \rightarrow Cl_3CSCl$
(8) $(CH_3)_2S_2 + Cl_2 \xrightarrow{} CH_3SCl \xrightarrow{Cl_2} ClCH_2SCl$
(9) $RSH + Cl_2 \rightarrow RSCl$
(10) $CF_3SSCF_3 + Cl_2 \rightarrow CF_3SCl$
(11) $RSH + Br_2 \rightarrow RSBr$
(12) $RCOSR' + Cl_2 \rightarrow RCOCl + R'SCl_3 \rightarrow R'SCl + Cl_2$
(13) $RCOSR' + Cl_2 \rightarrow RCCl_2SCl + R'SCl_3$ A particular illustration of the methods used to produce the novel sulfur- and halogen-containing compounds of this invention is the reaction of ethanesulfenyl bromide with 3,9-(α,α'-dimethyl)divinylspirobi(meta-dioxane):

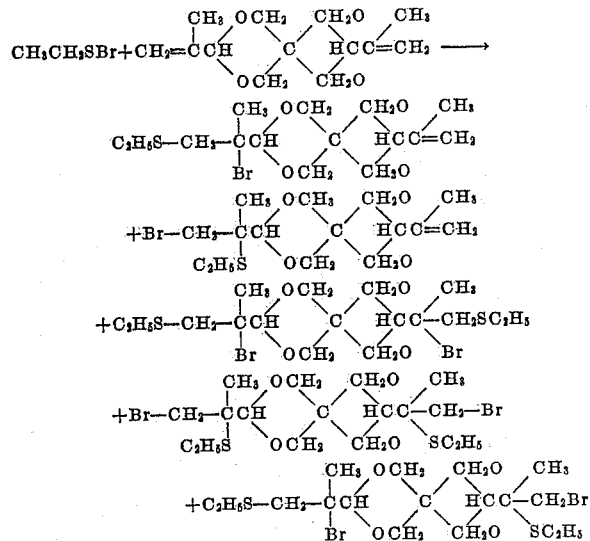

Another illustration is the reaction of ethylenebis(disulfur chloride) with 3,9-(β,β'-dimethyl)divinylspirobi(meta-dioxane):

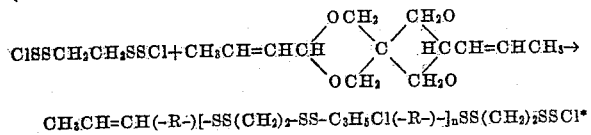

$CH_3CH=CH(-R-)[-SS(CH_2)_2-SS-C_2H_5Cl(-R-)-]_nSS(CH_2)_2SSCl$*

*A variety of simple addition products may also be obtained similar to those shown in the foregoing illustration.

wherein (—R—) is

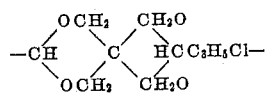

The constitution of the novel compounds obtained by the methods of this invention varies in a manner depending on the reaction conditions, and on the kinds of reactants and their functionality. When the sulfur halide reactant contains one reactive (S—X) group, then the reaction of the sulfur halide with 3,9-divinylspirobi(meta-dioxane) derivatives affords reaction products which result from the interaction of one spirobi(meta-dioxane) vinyl group with the sulfur halide compound and/or the interaction of both vinyl groups with said sulfur halide. As shown in the foregoing illustration of the reaction between ethanesulfenyl bromide and 3,9-(α,α'-dimethyl)-divinylspirobi(meta-dioxane), there are two modes of addition of a sulfur halide to each vinyl group which accounts for additional isomeric forms.

Although a variety of isomeric products is possible for a particular set of reactants, it is not unequivocal that all or most of the isomers will be produced. Oftentimes, pure products, i.e., one isomeric form, or essentially pure products will be formed. This may be due to the inherent nature of the reactants (e.g., steric effects or electronic influences such as resonance and inductive effects) which favors the formation of one particular isomer over all the others, or it may be due to controlled manipulation of the reaction conditions in a manner known to limit the latitude of a reaction course.

When a reaction product is a mixture of isomers then it can either be resolved into separate components, with the said components being used individually in applications, or the product mixture can be applied to some useful end without resolution into pure components. For convenience and economy, the unresolved product mixtures are preferred in most applications.

When the sulfur halide reactant contains at least two reactive (S—X) groups then polymerization can occur as well as simple addition. This is illustrated in the foregoing illustration of the reaction between ethylenebis(disulfur chloride) and 3,9-(β,β'-dimethyl)divinylspirobi(meta-dioxane).

Organic sulfur halides, i.e., sulfenyl halides, can be of an almost unlimited variety for the purposes of this invention, the only limitations being determined by practical considerations and the results desired in a particular application. As mentioned before, the essential requirement is the presence of at least one (S—X) group that is reactive with 3,9-divinylspirobi(meta-dioxane) compounds.

The reaction of a sulfur halide compound and a 3,9-divinylspirobi(meta-dioxane) proceeds well under moderate conditions. For most of the reactions it is only necessary to mix the reactants and maintain a reaction temperature between about 40° and 180° C., with a temperature between 80° and 150° C. being in the preferred range. When particularly reactive compounds are being combined, then it may be necessary to use a temperature in the lower range of temperatures. For compounds that are sluggish in their reactivity it may be necessary to heat a reaction medium to a temperature above 200° C. It is practical and convenient to conduct the reactions under atmospheric pressure. If one of the components of the reaction mixture is volatile at the reaction temperature, then a closed system can be used under autogenous pressure or under an imposed pressure.

A solvent medium may be used if convenient and desirable. In some cases a solvent will help yield optimum results, e.g., when the solvent compensates for incompatible solubility properties of the reactants. The solvents that are useful include benzene, toluene, xylene, chloroform, carbon tetrachloride, carbon disulfide, dioxane, diethyl ether of diethylene glycol, dibutyl ether, tetrahydrofuran, heptane and cyclohexane.

The molar ratio of 3,9-divinylspirobi(meta-dioxane) to sulfur halide compound can vary between about 1:10 and 1:0.5, with an excess of sulfur halide compound being preferred. The reaction can be conducted in either a continuous or batchwise fashion. The reaction time is dependent on the kind of reactants, the reaction conditions and, in particular, on the reaction temperature. A typical reaction time would be between 0.1 hour and 10 hours.

The products of this present invention have chemical and commercial application. They may be used as accelerators for curing rubber and as intermediates in the production of other chemicals.

The unique properties of these liquid and solid sulfur-halogen-containing spirobi(meta-dioxane) derivatives can be imparted to other materials such as natural and synthetic polymers and elastomers by mixture or combination of the derivatives with the said materials.

Some of the products of this invention may be used as the flexibilizing constituents in resin-based adhesive and potting compounds. They also find application in the manufacture of putties and cements. Carbon blacks and other reinforcing pigments may be mixed with the solid products of this invention.

The presence of reactive sites such as halogen groups in the derivatives makes them susceptible to cross-linking reactions such as would occur if said derivatives were treated with a cross-linking agent such as an alkali polysulfide.

The following examples will serve to illustrate particular embodiments of this invention:

EXAMPLE 1

This example illustrates the reaction between a spirobi(meta-dioxane) derivative and an inorganic monosulfur halide:

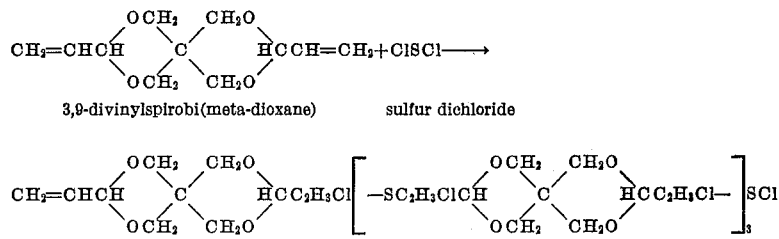

A solution of 3,9-divinylspirobi(meta-dioxane) (42 grams, 0.2 mole) in benzene (84 grams) was stirred at 25° C. in a glass reaction flask equipped with a stirrer, reflux condenser and a glass feed tank. Sulfur dichloride (45 grams, 0.44 mole) was added to the reaction medium over a period of 30 minutes. After the mixture was heated to reflux (82° C.), the volatile components were removed at a kettle temperature of 58° C./10 mm. to yield 84 grams of a tacky residue product. The product was dissolved in hot acetone (400 milliliters) and precipitated by the addition of methanol (700 milliliters) to yield 40 grams of a colorless polymer (M.P. 162–180° C.) which had physical constants that approximated the formula in the above reaction scheme.

Analysis for $C_{44}H_{64}Cl_8O_{16}S_4$: Calculated—C, 41.9; H, 5.1; Cl, 22.5; S, 10.2. Found—C, 41.5; H, 5.3; Cl, 22.0; S, 10.6. Molecular weight calc.—1260. Menzies-Wright method—1464.

EXAMPLE 2

This example illustrates the reaction between a spirobi(meta-dioxane) derivative and an inorganic disulfur halide:

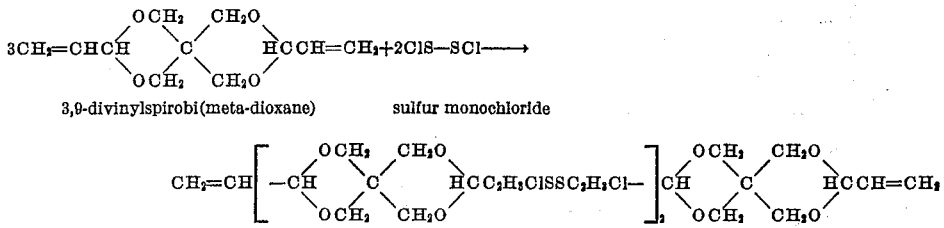

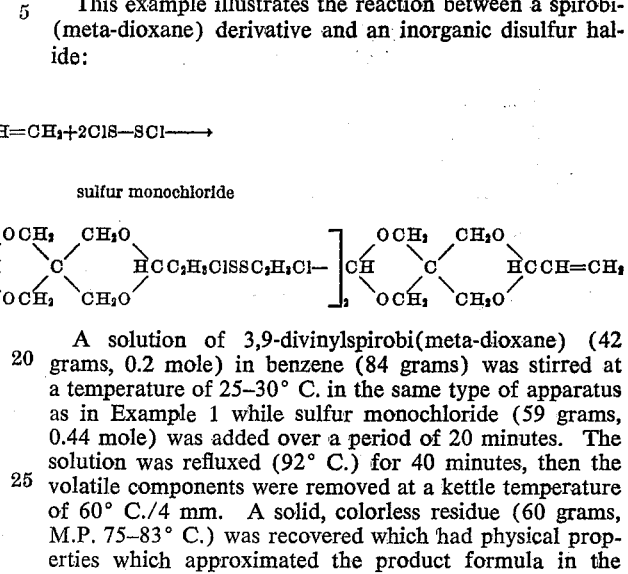

A solution of 3,9-divinylspirobi(meta-dioxane) (42 grams, 0.2 mole) in benzene (84 grams) was stirred at a temperature of 25–30° C. in the same type of apparatus as in Example 1 while sulfur monochloride (59 grams, 0.44 mole) was added over a period of 20 minutes. The solution was refluxed (92° C.) for 40 minutes, then the volatile components were removed at a kettle temperature of 60° C./4 mm. A solid, colorless residue (60 grams, M.P. 75–83° C.) was recovered which had physical properties which approximated the product formula in the above reaction scheme.

Analysis for $C_{33}H_{48}Cl_4O_{12}S_4$: Calculated—C, 43.7; H, 5.3; Cl, 15.7; S, 14.1. Found—C, 45.4; H, 5.9; Cl, 14.7; S, 13.5. Molecular weight calc.—906. Menzies-Wright method—1045.

EXAMPLE 3

This example illustrates the reaction between a spirobi(meta-dioxane) derivative and an organic sulfur halide:

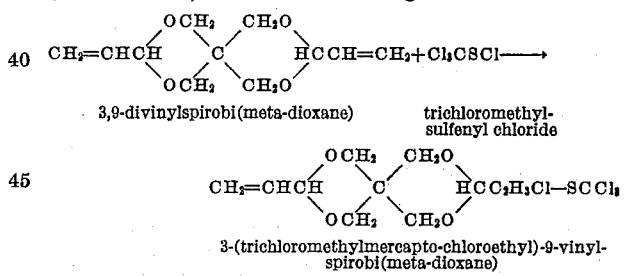

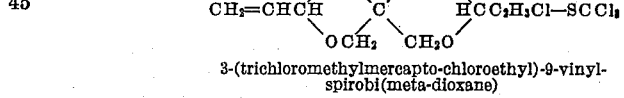

3-(trichloromethylmercapto-chloroethyl)-9-vinyl-spirobi(meta-dioxane)

A mixture of 3,9-divinylspirobi(meta-dioxane) (106 grams, 0.5 mole) and 95% trichloromethylsulfenyl chloride (215 grams, 1.1 moles) was heated at 140° C. for 2 hours in the same type of apparatus as in the previous examples. The reaction mixture was stripped of volatile components at a temperature of 124° C./8 mm. A liquid residue (191 grams) was recovered which had physical constants which approximated the product formula in the above reaction scheme, $n_D^{30}$ 1.5381.

Analysis for $C_{12}H_{16}Cl_4O_4S$: Calculated—C, 36.2; H, 4.0; Cl, 35.7; S, 8.0. Found—C, 35.9; H, 4.0; Cl, 33.8; S, 10.0. Molecular weight calc.—398. Menzies-Wright method—391.

EXAMPLE 4

This example illustrates the application of the products from Examples 1 and 3 as effective accelerators for the vulcanization of natural rubber:

*Formulations compounded 5 minutes at 75° to 90° C. on a two-roll mill*

(a) 100 grams natural rubber (smoked sheet)
1 gram "Age Rite" powder
5 grams zinc chloride
2 grams sulfur
3 grams stearic acid
50 grams "Kosmobile 77EPC" carbon black (b) Same as (a) except 1 gram of the product described in Example 1 was added.

(c) Same as (a) except 1 gram of the product described in Example 3 was added.

Formulations (a), (b) and (c) were cured (vulcanized) for 60 minutes at 140° C. in 5¼ inch positive molds. The cured compositions had the following properties:

|  | (a) | (b) | (c) |
| --- | --- | --- | --- |
| Tensile, p.s.i. | 380 | 1,300 | 1,900 |
| Elongation, percent | 375 | 450 | 510 |
| Load at 300% elongation, p.s.i. | 200 | 600 | 790 |
| Hardness, Durometer A | 14 | 38 | 42 |
| ASTM Stiffness Modulus, p.s.i. | (¹) | 6,300 | 13,000 |

¹ Too soft and flexible for testing.

Having described our invention, we claim:

1. A composition of matter having the structure:

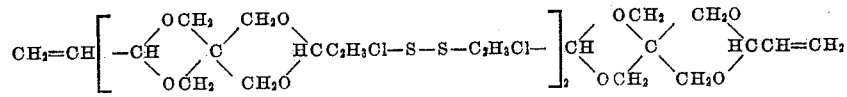

2. A composition of matter having the structure:

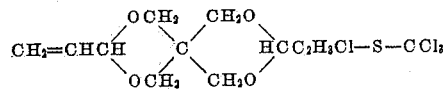

3. A composition of matter having the structure:

4. A process for producing halogen- and sulfur-containing spirobi(meta-dioxane) derivatives which comprises reacting together a 3,9-divinylspirobi(meta-diox-ane) compound and a sulfur halide, said 3,9-divinylspirobi(meta-dioxane) having the formula:

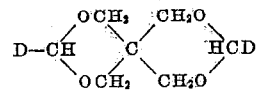

wherein D is selected from the group consisting of (R—CH=CH—) and

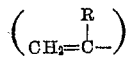

and R is selected from the group consisting of hydrogen, halogen and lower alkyl; said sulfur halide having the formula:

$$Z—S_m—X$$

wherein X is halogen with atomic weight between 30 and 130; m is an integer selected from 1 and 2; and Z is selected from the group consisting of lower alkyl, halo lower alkyl, chlorine if X is chlorine, and bromine if X is bromine and m is 2.

5. The process of claim 4 wherein the spirobi(meta-dioxane) compound is 3,9-divinylspirobi(meta-dioxane).

6. The process of claim 4 wherein the spirobi(meta-dioxane) compound is 3,9-(α,α'-dimethyl)divinylspirobi(meta-dioxane).

7. The process of claim 4 wherein the sulfur halide is sulfur monochloride.

8. The process of claim 4 wherein the sulfur halide is sulfur dichloride.

9. The process of claim 4 wherein the sulfur halide is trichloromethylsulfenyl chloride.

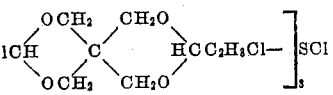

References Cited in the file of this patent

UNITED STATES PATENTS

| 2,150,425 | Cramer | Mar. 14, 1939 |
| 2,343,566 | Mathes | Mar. 7, 1944 |
| 2,399,068 | Senkus | Apr. 23, 1946 |
| 2,525,681 | Jones et al. | Oct. 10, 1950 |
| 2,709,715 | Heller | May 31, 1955 |

UNITED STATES PATENT OFFICE
CERTIFICATE OF CORRECTION

Patent No. 2,992,233                          July 11, 1961

Harry A. Stansbury, Jr., et al.

It is hereby certified that error appears in the above numbered patent requiring correction and that the said Letters Patent should read as corrected below.

Column 2, line 15, for that portion of the formula reading "$2CH_2=CHCHOH+$" read -- $2CH_2=CHCHO +$ --.

Signed and sealed this 30th day of January 1962.

(SEAL)
Attest:

ERNEST W. SWIDER
Attesting Officer

DAVID L. LADD
Commissioner of Patents